United States Patent [19]

Usui

[11] Patent Number: 4,909,462
[45] Date of Patent: Mar. 20, 1990

[54] DEVICE AND METHOD FOR LOCKING PIPING

[75] Inventor: Masayoshi Usui, Numazu, Japan

[73] Assignee: Usui Kokusai Sangyo Kaisha Ltd., Sunto, Japan

[21] Appl. No.: 269,253

[22] Filed: Nov. 9, 1988

[30] Foreign Application Priority Data

Nov. 18, 1987 [JP] Japan .................. 62-291524
Nov. 18, 1987 [JP] Japan .................. 62-291525

[51] Int. Cl.⁴ .............................. F16L 3/08
[52] U.S. Cl. .................... 248/74.1; 29/517; 248/68.1
[58] Field of Search ........... 248/74.1, 74.2, 74.3, 248/65, 316.1, 316.7, 49, 62, 68.1; 29/517; 174/DIG. 8; 285/64

[56] References Cited

U.S. PATENT DOCUMENTS

| | | | |
|---|---|---|---|
| 541,420 | 6/1895 | Bookhout | 248/74.1 |
| 2,099,465 | 11/1937 | Burleson | 248/74.1 |
| 3,218,012 | 11/1965 | Volpe | 248/74.1 X |
| 4,795,114 | 1/1989 | Usui et al. | 248/74.1 X |

Primary Examiner—Ramon O. Ramirez
Attorney, Agent, or Firm—Anthony J. Casella; Gerald E. Hespos

[57] ABSTRACT

A device for locking a piping with a small diameter at a bend formed into almost S- or C-shape at a proper portion longitudinal of the piping, which is clasped by one side wall end portion of a strap clamp member curved segmentally in section. The clasping portion is constituted of a curved wall and a holdfast wall or formed only of the holdfast wall. For locking, the piping is bent or curved at a proper longitudinal portion, and then clasped thereat by the clamp member formed into a shape coincident with the bend. The piping is locked otherwise from having a straight portion clasped beforehand by the clamp member, and then the clasping portion subjected to a press working on a grooved die, thereby forming a uniform bend according to the grooves.

19 Claims, 2 Drawing Sheets

DEVICE AND METHOD FOR LOCKING PIPING

BACKGROUND OF THE INVENTION

1. Field of the Invention

The present invention relates to a device and method for locking a piping by means of a clamp member which is mounted at a proper portion longitudinal of the piping such as metallic conduit or resin tube with a relatively small diameter 20 m/m or below which is disposed generally as a passage for feeding fuel, oil, air and the like to automobiles, or various machinery and equipment.

2. Description of the Prior Art

A prior art method for locking a metallic conduit to another substrate by means of a clamp member comprises clasping a piping ($P_1$) at a proper straight portion circumferential and longitudinal thereof by a clamp member (11) having a segmental holdfast (14) provided integrally with a fitting wall (13) having a bolt hole (12) on the holdfast as illustrated in FIG. 10 and FIG. 11, or brazing a clasping peripheral surface of the holdfast (14).

Then, for locking a resin tube, a resin-made particular-shaped clamp member was required.

However, in tee aforementioned prior art method for locking a metallic conduit, since the locking of the piping ($P_1$) comprises clasping at a straight portion circumferential and longitudinal thereof or brazing the clasping perihheral surface, longitudinal and circumferential dislocations or friction flaws may result on the piping ($P_1$), in the former, from vibrations of a car body or machinery and equipment lasting for a long period of time as disposed, thus incurring crack, failure or other damage Then in the latter, a corrosion resistance coating on overall products through plating or the like is quite necessary after brazing, and the plating under the state of complicated bent forms inevitably deteriorates a working efficiency, a difficulty of forming the plating coat having a desired high corrosion resistance is incurred at the same time.

Further, in the method for locking resin tubes, not only time and labor are required much for manufacture of a clamp member, but also a manufacturing cost becomes expensive.

SUMMARY OF THE INVENTION

An object of the invention is to provide a device and method for locking a piping by means of a clamp member which is effective in solving the aforementioned problems inherent in the prior art.

The invention relates to a device for locking a piping such as metallic conduit or resin tube with a small diameter at a bend formed at a proper portion longitudinal thereof and bent to almost S-shape or curved to almost C-shape which is clasped by one side wall end portion of a strap clamp member curved segmentally in section, thus engaging the clasping portion along the.tend cf the piping, wherein the clasping portion is constituted of a curved wall and a holdfast wall or formed only of the holdfast wall.

The invention relates further to a method for locking a piping with a small diameter by bending or curving at a proper longitudinal portion, and then clasping the bend thus formed by means of a clamp member provided with a holdfast wall ranging to a segmental curved wall at the center of one side wall end portion in a cross direction or on opposite sides thereof, and formed into a shape coincident with the bend by having a fitting wall to a substrate provided integrally on the other side wall end portion, thus engaging the holdfast wall portion ranging to the curved wall along the bend.

Then, the piping locking method according to the invention comprises clasping beforehand a straight piping with a small diameter at a proper longitudinal portion thereof with a holdfast wall portion of a clamp member provided with a holdfast wall segmental in section with a fitting wall to a substrate formed integrally on its one side wall end portion in a cross direction, then applying a collective press working to the clasping portion on a die having grooves of a relatively gentle step or curve to form the grooved uniform bend, thus engaging the holdfast wall along the bend.

According to the invention, the holdfast wall is engaged with the bend provided on a piping side, or the holdfast wall clasped to the piping is bent by a collective press working, thus preventing dislocations longitudinal and circumferential of the piping side through an eccentric contact of an inner peripheral surface of the holdfast wall portion and an outer circumferential wall of the piping at the bend, accordingly friction flaw, crack, failure and the like which are capable of arising on the piping side at the engaging portion can be prevented to ensure a firm locking, further a piping and a clamp member subjected to coating or plating can be used, and plating after locking is not required, therefore a working efficiency can sharply be enhanced, and the manufacturing cost can also be reduced.

DETAILED DESCRIPTION OF PREFERRED EMBODIMENTS

Figure 1:
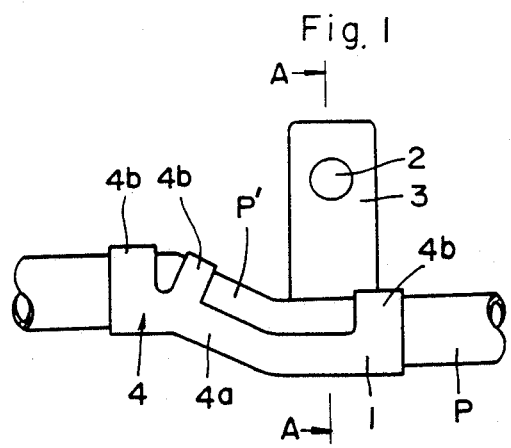
FIG. 1 is a plan view of one embodiment of an engaged and locked piping constructed according to a device and method for locking a piping by means of a clamp member of the invention.
Figure 2:
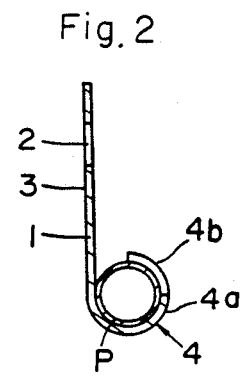
FIG. 2 is a sectional view taken on line A - A of FIG. 1.
Figure 3:
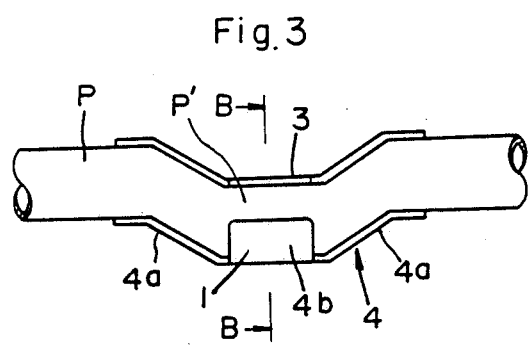
FIG. 3 is an illustration equivalent to FIG. 1, representing another embodiment.
Figure 4:
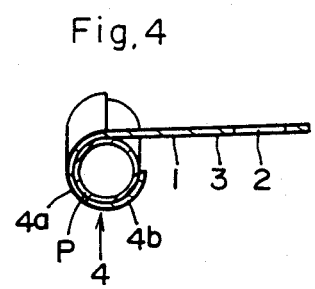
FIG. 4 is a sectional view taken on line B—B of FIG. 3.
Figure 5:
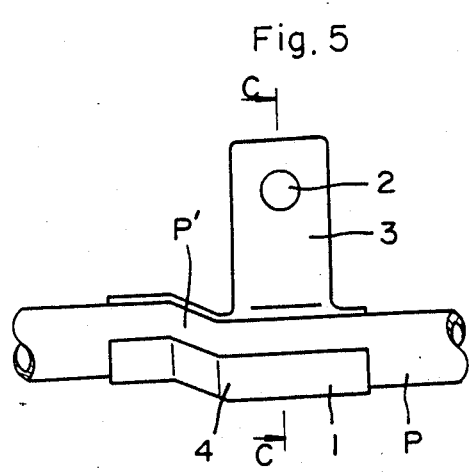
FIG. 5 is a plan view of an engaged and locked piping constructed according to a device and method for locking a piping by means of a clamp member given in further embodiment of the invention.
Figure 6:
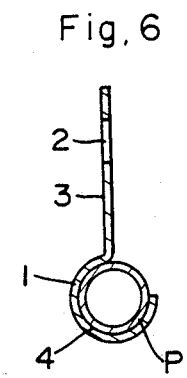
FIG. 6 is a sectional view taken on line C—C of FIG. 5.
Figure 7:
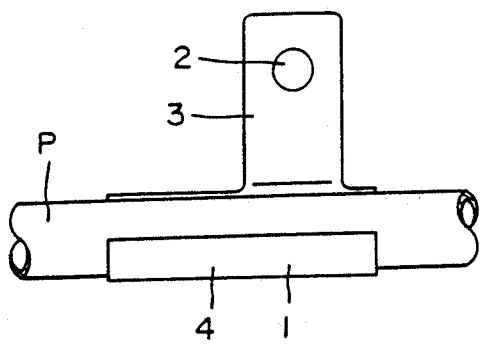
FIG. 7 is a constitutional diagram before a collective press working of FIG. 5.
Figure 8:
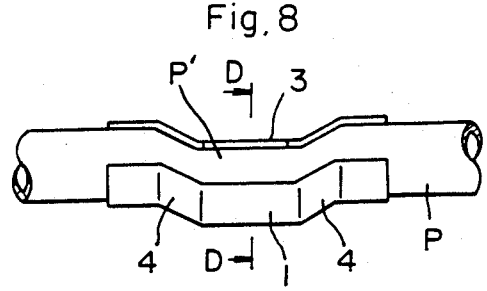
FIG. 8 is an illustration equivalent to FIG. 1, representing an even further embodiment.
Figure 9:
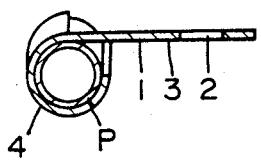
FIG. 9 is a sectional view taken on line D—D of FIG. 8.
Figure 10:
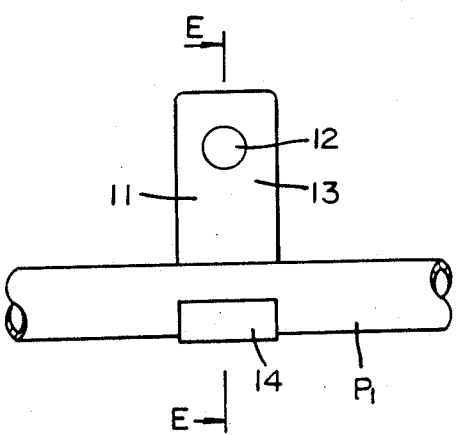
FIG. 10 is a plan view of an engaged and locked piping representing a prior art.
Figure 11:
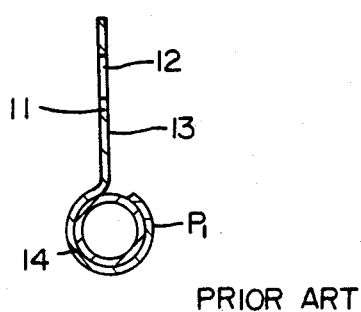
FIG. 11 is a sectional view taken on line E—E of FIG. 10.

Like reference numerals represent like parts in FIG. 1 to FIG. 9.

First, in FIG. 1 to FIG. 4, (1) denotes a strap clamp member provided with a clasping portion (4) ranging to a curved wall (4) segmental in section at the center of one side wall end portion in a cross direction or on opposite sides thereof, and having a fitting wall (3) having a bolt hole (2) for fitting on a substrate (not indicated) and others provided integrally on the other side wall end portion, which is formed to coincide with a bend (P') almost S-shaped or C-shaped at a proper portion longitudinal of a piping (P) such as metallic conduit or resin tube with a small diameter 20 m/m or below. Then, the clasping portion (4) consisting of a curved wall (4a) and a holdfast wall (4b) ranging thereto is engaged therewith to locking by means of the clamp member (1) along the bend (P') on the piping (P) side, and in this case, the holdfast wall (4b) is clasped and so engaged as to hold at least a shoulder of the almost S-shaped bend (P') in FIG. 1 and FIG. 2, while it is clasped and so engaged as to hold the central portion of the almost C-shaped bend (P') in FIG. 3 and FIG. 4.

In the embodiment represented in FIG. 1 to FIG. 4, longitudinal and circumferential dislocations will never be caused and thus a secure locking may be ensured by an engagement of the clamp member (1) with the bend which is formed to coincide with the bend applied beforehand on the piping (P) side at the clasping portion (4) consisting of the curved wall (4a) and the holdfast wall (4b) ranging thereto.

Next, in FIG. 5 to FIG. 9, the strap clamp member (1) has almost same width covering its full length, and is provided with the holdfast wall (4) segmental in section on its one side wall end portion, and with the holdfast wall (4) of the clamp member (1) clasped at a proper portion longitudinal of the piping (P), the clasping portion is formed into a uniform grooved bend (P') through collective press working on a die having grooves in relatively gentle step or almost S-shape or almost C-shape or curve, and the holdfast wall (4) is engaged therewith to locking along the bend (P').

In the embodiment given in FIG. 5 to FIG. 9, the clamp member (1) is clasped to a straight portion of the piping at the holdfast wall (4), the bend (P') is formed uniformly through collective press working thereafter, and thus an engagement of the relatively gentle bend in the entirety is effective in preventing longitudinal and circumferential dislocations, thereby ensuring a secure locking.

What is claimed is:

1. A locking device for piping comprising a piping with small diameter having a bend on at least one portion longitudinal thereof, a strap clamp member having a curved holdfast wall means segmental in section on its one wall end portion in the cross direction, and a fitting wall means to a substrate on the other wall end portion, the holdfast wall means of the clamp member being clasped and engaged along the piping bend.

2. The locking device as defined in claim 1, wherein said piping is a metallic conduit or resin tube.

3. The locking device as defined in claim 1, wherein said holdfast wall means comprising a curved wall segmental in section and a holdfast wall ranging thereto.

4. The locking device as defined in claim 3, wherein said holdfast wall is provided at the center of the one wall end portion of the clamp member.

5. The locking device as defined in claim 3, wherein said holdfast wall is provided on opposite sides of the one wall end portion of the clamp member.

6. The locking device as defined in claim 1, said holdfast wall means comprising a holdfast wall segmental in section and having a width almost equal to the cross direction of the clamp member.

7. The locking device as defined in claim 1, wherein said bend is bent into almost S-shape or curved into almost C-shape.

8. The locking device as defined in claim 7, wherein said holdfast wall means is clasped and so engaged as to hold a shoulder of the almost S-shaped bend.

9. The locking device as defined in claim 7, wherein said holdfast wall means is clasped and engaged at the central portion of the almost C-shaped bend.

10. The locking device as defined in claim 7, wherein said holdfast wall means is clasped and engaged with the bend almost entirely.

11. The locking device as defined in claim 1, said fitting wall means comprising a flat fitting wall and a bolt hole to a substrate perforated in the fitting wall.

12. A locking method for piping, comprising bending a piping with a small diameter at least on one portion longitudinal thereof, forming a curved wall by curving another side end portion of a clamp member having a fitting wall on one side wall end portion into a shape segmental in section which coincides with a bend of the piping, clasping the curved wall to the bend of the piping, then engaging a holdfast wall portion ranging to the curved wall therewith along the bend.

13. The locking method as defined in claim 12, said piping comprising a metallic conduit or resin tube.

14. The locking method as defined in claim 12, wherein said piping is bent into almost S-shape or curved into almost C-shape.

15. The locking method as defined in claim 14, wherein said holdfast wall portion is engaged so as to hold a shoulder of the almost S-shaped bend.

16. The locking method as defined in claim 14, wherein said holdfast wall portion is engaged to hold the central portion of the almost C-shaped bend.

17. A locking method for piping, comprising clasping a piping with a small diameter which is kept straight segmentally in section by another side wall end portion of a clamp member having a fitting wall on its one side wall end portion, pressing collectively and so bending the clasping portion on a grooved die, engaging the clasping portion along the bent portion.

18. The locking method as defined in claim 17, wherein said piping is a metallic conduit or resin tube.

19. The locking method as defined in claim 17, wherein said clasping portion is bent into almost S-shape or curved into almost C-shape.

* * * * *